US006968720B2

(12) United States Patent
Balagna et al.

(10) Patent No.: US 6,968,720 B2
(45) Date of Patent: Nov. 29, 2005

(54) COLD ROLLING METHOD AND APPARATUS FOR FORMING ANNULAR PIECES

(75) Inventors: Adelmo Balagna, Turin (IT); Erling Zackrisson, Göteborg (SE)

(73) Assignee: SKF Industrie S.p.A., Turin (IT)

( * ) Notice: Subject to any disclaimer, the term of this patent is extended or adjusted under 35 U.S.C. 154(b) by 58 days.

(21) Appl. No.: 10/473,041

(22) PCT Filed: Mar. 28, 2002

(86) PCT No.: PCT/EP02/03505

§ 371 (c)(1),
(2), (4) Date: Feb. 19, 2004

(87) PCT Pub. No.: WO02/081119

PCT Pub. Date: Oct. 17, 2002

(65) Prior Publication Data
US 2004/0250586 A1  Dec. 16, 2004

(30) Foreign Application Priority Data

Apr. 4, 2001  (IT)  ............................. TO01A0324

(51) Int. Cl.⁷ .............................................. B21D 15/04
(52) U.S. Cl. ............................ 72/105; 72/91; 72/107; 72/110
(58) Field of Search ........................... 72/91, 105, 106, 72/107, 110, 120, 121

(56) References Cited

U.S. PATENT DOCUMENTS

| 3,576,121 A | | 4/1971 | Greis |
| 3,822,574 A | * | 7/1974 | Krupin et al. ................. 72/110 |
| 3,855,833 A | | 12/1974 | Connell |
| 4,047,414 A | * | 9/1977 | Druge et al. .................... 72/91 |
| 4,510,781 A | * | 4/1985 | Holt .............................. 72/105 |
| 4,869,088 A | * | 9/1989 | Kadotani ...................... 72/11.1 |
| 5,605,068 A | * | 2/1997 | Yamasoto et al. ............ 72/105 |
| 6,038,758 A | * | 3/2000 | Kanai et al. ................... 29/557 |

FOREIGN PATENT DOCUMENTS

| DE | 32 37 295 | 4/1984 |
| DE | 38 24 856 | 1/1990 |
| FR | 927312 | 10/1947 |
| GB | 1 187 370 | 4/1970 |
| GB | 2 304 612 | 3/1997 |
| JP | 06285581 | 10/1994 |
| JP | 08281364 | 10/1996 |

* cited by examiner

Primary Examiner—Ed Tolan
(74) Attorney, Agent, or Firm—Merchant & Gould P.C.

(57) ABSTRACT

A cold rolling method and apparatus for forming an annular workpiece (10) with an outer surface (11) having a given contour and an inner surface (12) having a given contour, starting from an annular blank. A rotatable forming mandrel (21) has a working surface (21a) with a contour corresponding to that of inner surface (12) to be formed. A forming die (51) has a cavity (52) with an inner working surface (53) in form of a surface of revolution corresponding to the outer surface (11) to be formed.

6 Claims, 5 Drawing Sheets

US 6,968,720 B2

COLD ROLLING METHOD AND APPARATUS FOR FORMING ANNULAR PIECES

This application is a 35 USC 371 of PCT/EP02/03505 filed Mar. 28, 2002.

The present invention refers to a cold rolling method and apparatus for forming annular pieces, in particular but not exclusively for forming the outer races of bearings. More particularly, the invention is applicable for forming asymmetrical races for roller bearings or angular contact ball bearings.

For a better understanding of prior art and problems inherent thereto, there will be at first described a cold rolling apparatus of conventional design, shown in FIG. 1 of the annexed drawings.

With reference to FIG. 1, there is schematically shown in cross-section part of a cold rolling apparatus of the type commonly known in the field with the expression "open die".

Reference numeral 10 designates an annular piece that is subjected, to a rolling process for forming its outer peripheral surface 11 and its inner surface 12. The annular piece 10 is radially compressed and rotated between an outer forming roller 13 and an inner forming mandrel 14. The outer roller 13 and the inner mandrel 14 have contours corresponding to the contours that it is desired to form at the outer 11 and inner 12 surfaces of the annular piece 10, respectively. The outer forming roller 13 is driven for rotation and exerts a radial thrust T that rotates the piece 10, the mandrel 14 and a reaction roller 15 in the direction indicated by the arrows. The combined action of the rotation and the radial thrust T between the forming roller 13 and the mandrel 14 provokes the desired deformation in the piece 10.

The workpiece is plastically deformed from the shape of its blank (shown in full line) to the final shape (shown in phantom). The rolling step causes an increase in the final diameter of the finished ring with respect to the diameter of the blank. A control device 16 having a mobile arm 17 stops the rolling process when the piece 10 reaches the desired final diameter.

As shown in FIG. 2, the rolled piece 10 has, in this example, a cylindrical peripheral outer surface 11, and a radially inner surface 12 that serves as an outer raceway for rolling bodies (not shown) of a bearing. The rolling operation may moreover form rounded radiused zones and possibly circumferential grooves, according to design requirements.

An example of an apparatus of the type schematically shown in FIG. 1 is disclosed in DE-38 24 856-A1.

The advantages obtainable by rolling processes are known. With this kind of processing, all the material of the annular blank is exploited for forming the finished piece. Furthermore, the rolling step compacts and orientates the superficial metallic layers of the ring where the forming rollers act. Owing to this effect, bearing races are obtained having generally a longer life with respect to races manufactured through processes involving a removal of material (for example lathe machining processes).

Conventional rolling processes of the above-discussed "open die" type are applicable for forming annular pieces having an essentially symmetrical section, such as that shown in FIG. 2, but not for annular pieces having asymmetrical sections, such as for example the one shown in FIG. 3. In fact, due to the asymmetrical shape of the contour of the mandrel, during the rolling step, this is subjected to reactions having axial components that tend to unbalance and/or break the mandrel and in any case inevitably form in the workpiece surfaces with an inadmissible taper ratio.

For this reason, heretofore races with an asymmetrical section have generally been turned.

The object of the present invention is to apply the cold rolling technique for forming, in particular, also annular elements with an asymmetrical section, so as to improve production efficiency and gain an overall reduction of production costs.

Another object of the invention is to manufacture bearing races having a high dimensional accuracy.

A further object of the invention is to provide a cold rolling apparatus having a particularly steady, strong and durable structure.

These and other objects and advantages, that will be better understood hereinafter, are achieved, according to the invention, by an apparatus and a cold rolling method as defined in the claims.

The constructional and functional features of an apparatus and of the steps of a method according to the invention will now be described, reference being made to the appended drawings, provided purely by way of non-limitative example, in which.

Figure 4:
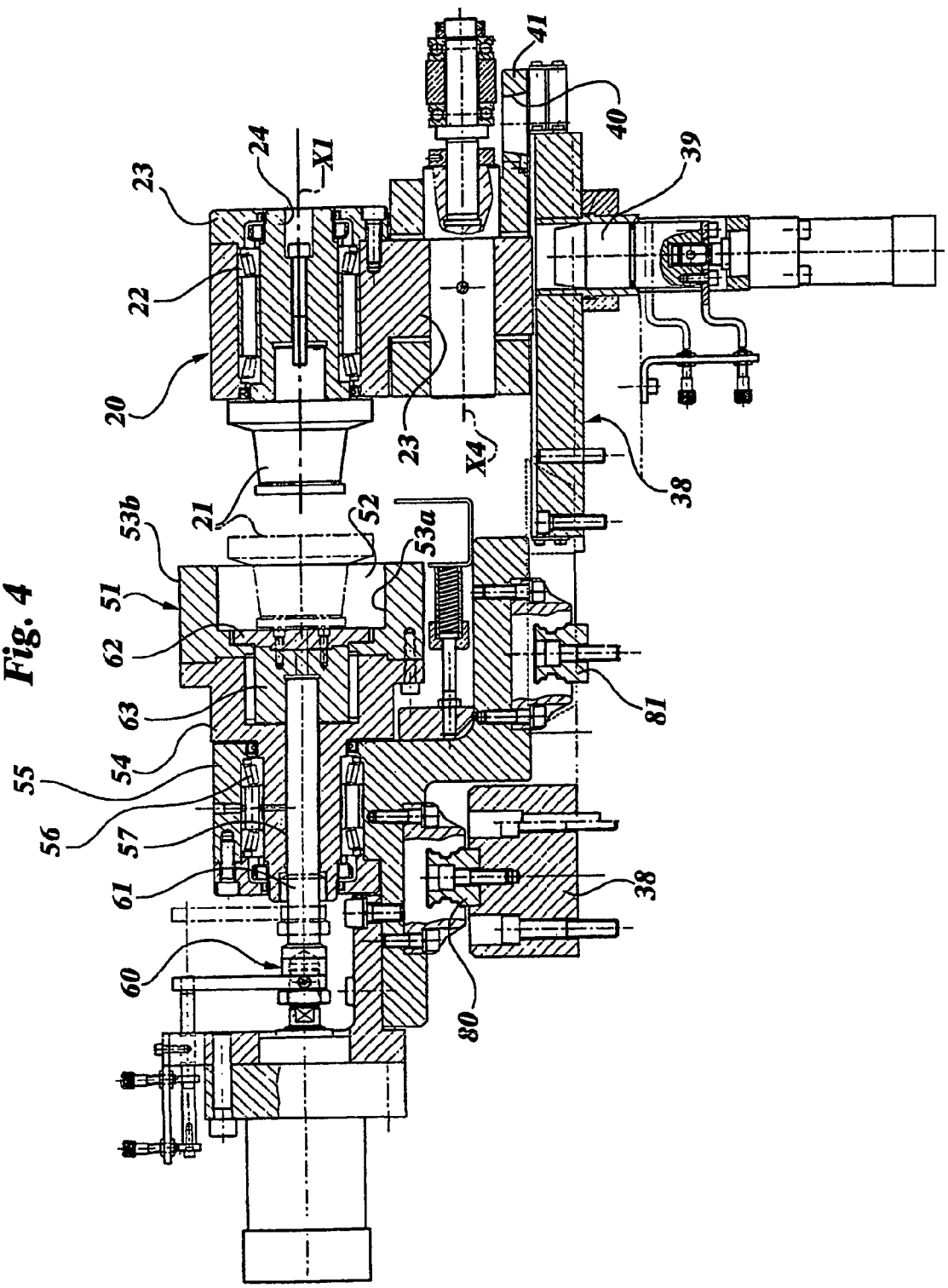
FIG. 4 is a vertical sectional view of a cold rolling apparatus according to the present invention.
Figure 5:
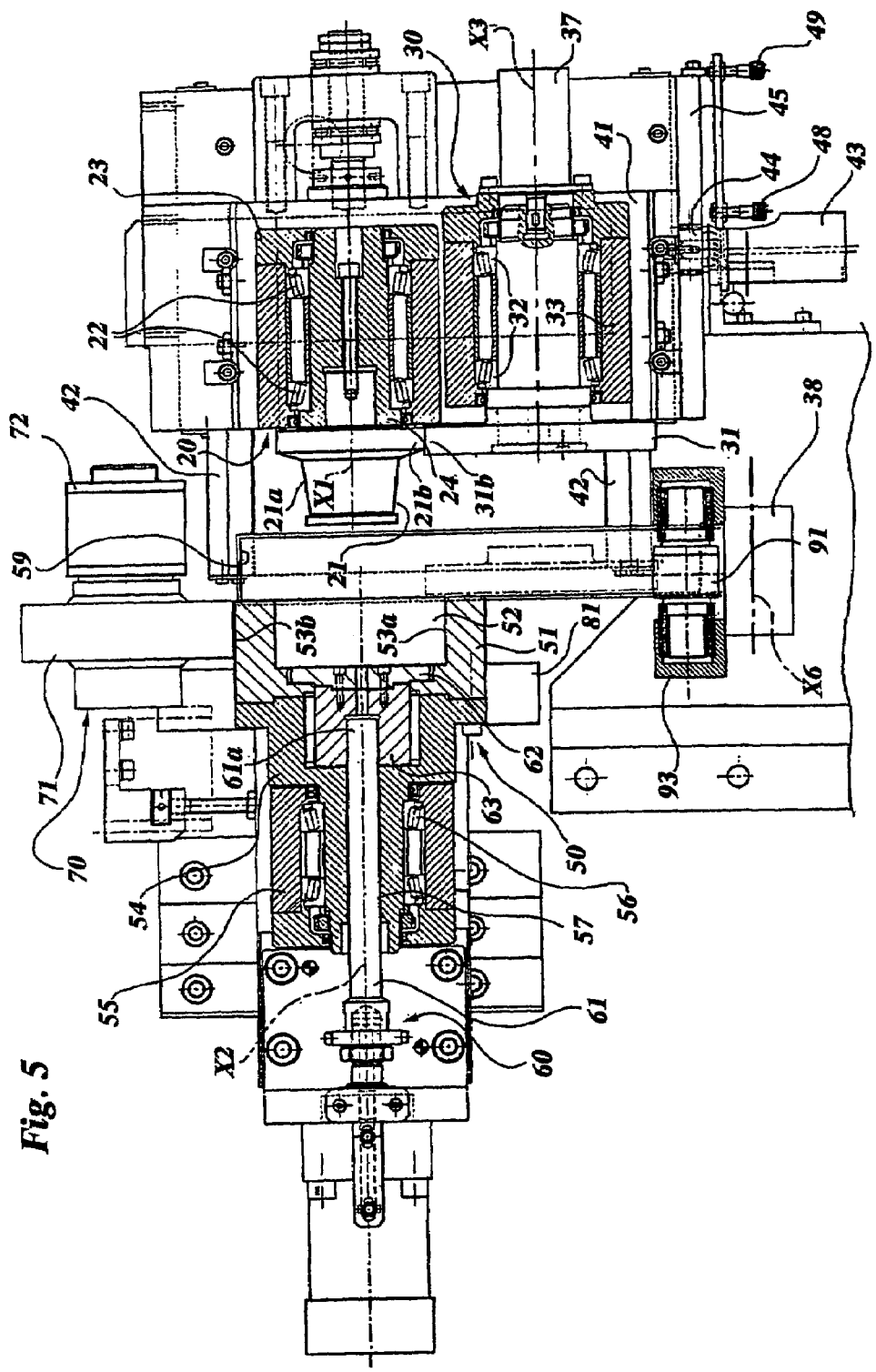
FIG. 5 is a plan view of the apparatus of FIG. 4.

Some parts of the apparatus shown in FIGS. 4 and 5 are per se known. Only the elements of specific importance and interest for the purposes of the implementation of the present invention will therefore be described in detail in the following description. For the construction of the parts and elements not shown in detail, reference may therefore be made to any known apparatus, such as those described for example in DE-38 24 856-A1 and JP-08281364-A.

The rolling apparatus of FIGS. 4 and 5 comprises a mandrel assembly indicated overall 20 provided with a forming mandrel 21 removably locked on a rotor 24. The rotor 24 is idly mounted about a horizontal axis X1 through bearings 22 in a journal box 23.

The forming mandrel 21 has a side surface 21a in form of a surface of revolution with a given profile for impressing the radially inner surface 12 of the annular piece 10 with a corresponding contour, as will be explained herein after. The forming mandrel 21 has a radial flange 21b with a peripheral surface which is engaged by the peripheral edge of the flange 31b of a flanged roller 31 of an intermediate assembly 30. The intermediate assembly 30 includes the idle roller 31 mounted for rotation about a horizontal axis X3 through bearings 32 within a journal box 33.

The journal boxes 23 and 33 of assemblies 20 and 30 are mounted on a supporting plate 41 slidable on horizontal longitudinal guides 42 parallel to the axes X1 and X3 and carried by a fixed frame 38. The plate 41 can translate longitudinally along the guides 42 under the action of a hydraulic motor 43 mounted on the frame 38. The motor 43 rotates a pinion 44 which meshes with a longitudinal rack 45 fast with the plate 41.

Preferably, the journal boxes 23 and 33 are pivotally mounted on the plate 41 with a limited capacity of oscillation about respective horizontal longitudinal axes which are parallel and located underneath the axes X1 and X3. In FIG. 4 there is shown only the oscillation axis X4 of journal box 23. This arrangement allows for limited movement of the assemblies 20 and 30 in transversal vertical planes, for reasons that will be explained hereinafter.

A hydraulically operated latch indicated 39 (FIG. 4) can be raised and lowered to engage and disengage from a seat 40 obtained in the longitudinally slidable plate 41. Latch 39 constitutes a mechanical stop which serves to prevent axial movement of the mandrel assembly 20 when this is in its advanced working position (shown in phantom to the left in FIG. 4).

A die assembly 50 comprises a die 51 in form of an annular vessel having an essentially cylindrical cavity 52 facing the mandrel assembly 20. The die 51 is removably locked onto the rotor 54 idly mounted about a longitudinal axis X2 within a journal box 55 through bearings 56.

The idle rotor 54 has a central longitudinal bore 57 through which passes a rod 61 of an ejection assembly 60. The right end portion 61a of the rod 61 engages an ejection block 63 removably secured to a disk-shaped bottom plate 62 fast for rotation with the die 51. The ejection assembly 60 serves to eject the finished piece out of the die 51, as will be explained more clearly in the following.

The die 51 has a radially inner wall 53a and a radially outer wall 53b. The inner wall 53a has the shape of a surface of revolution with a given profile. The shape of the surface 53a, which is the working surface of the die 51, corresponds to the shape of the final peripheral or outer surface 11 that is to be obtained in the annular piece 10.

The die 51 is driven for rotation about its axis X2 by a pressure roller 71 (FIG. 5) which engages the outer cylindrical surface 53b of the die. The roller 71 is part of a pressure assembly 70 comprised of a hydraulic motor 72.

The die assembly 50 and the pressure roller 71 are slidably mounted along transversal guides 80; 81 carried by the fixed frame 38 (FIG. 4). The movement of transversal or radial thrust of the pressure assembly 70 and the die assembly 50 along the guides 80, 81 is provoked by a hydraulic actuator mounted on the fixed frame and not shown for simplicity.

Figure 7:
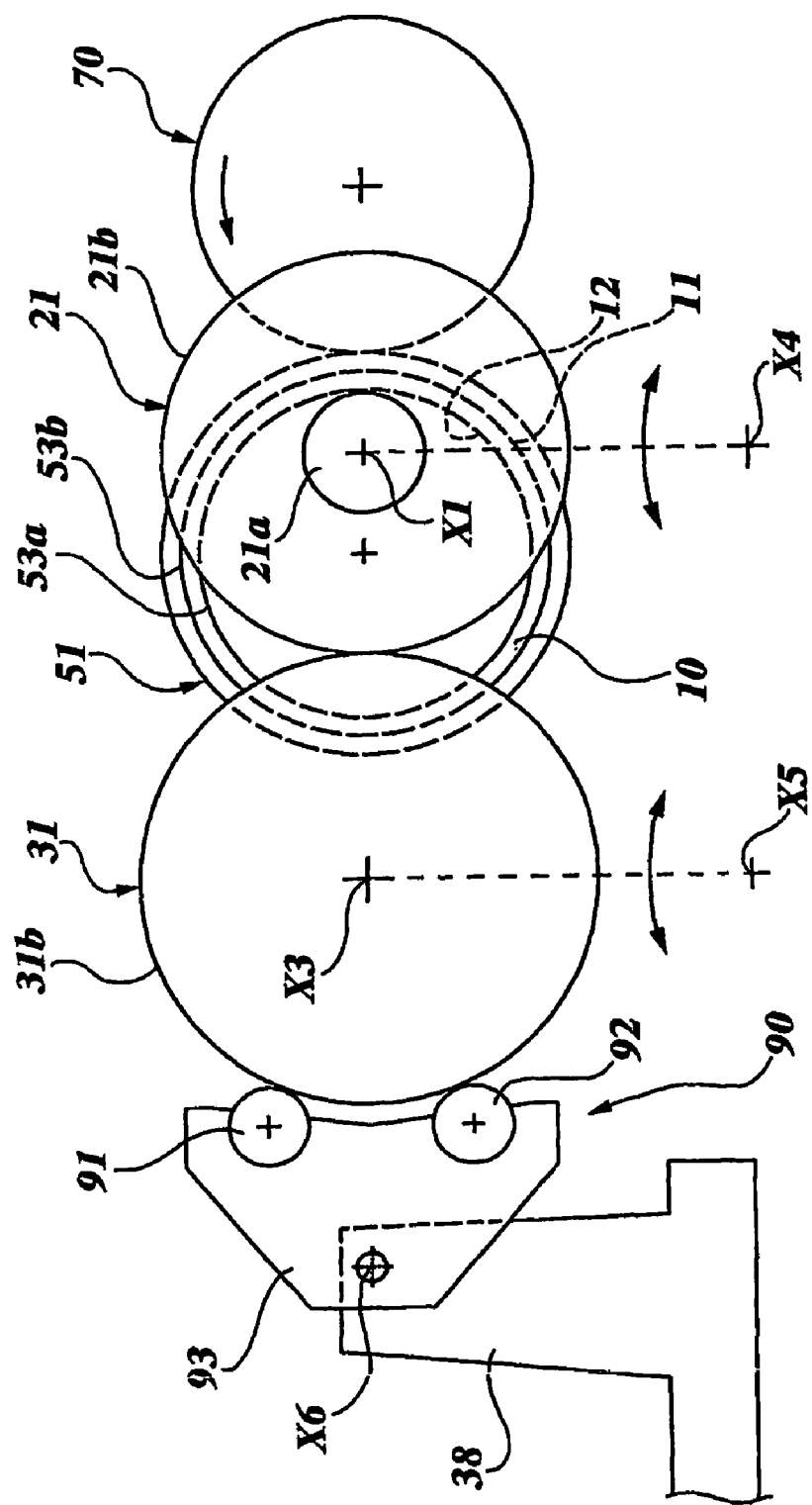
FIG. 7 is a partially sectioned elevational view schematically showing the forming members, a pressure roller and a reaction roller of the apparatus according to the invention.

A reaction assembly indicated 90 in FIG. 7 comprises a pair of longitudinal shafts 91, 92 idly mounted on a centering support 93 hinged to the fixed frame 38 about a longitudinal axis X6. The shafts 91, 92 are respectively located above and underneath the horizontal plane in which the axis X3 of the intermediate roller 31 lies. When this roller is transversally urged to the left, it oscillates slightly about its own axis X5 and the support 93 carries out a corresponding rotation about the axis X6 reaching an arrangement of stable equilibrium owing to which the reaction assembly 90 effectively resists the radial thrust transmitted by the pressure roller 71 through the die 51, the annular piece 10, the mandrel 21 and the intermediate roller 31.

Operation of the apparatus according to the present invention is as follows.

In accordance with the final shape that it is desired to give to an annular blank 10, a forming mandrel 21 and a die 51 having respective working surfaces 21a and 53a with the desired contours are mounted on the mandrel assembly 20 and the die assembly 50.

An annular blank 10 is automatically loaded on the mandrel 21. The hydraulic motor 43 is activated to longitudinally advance (to the left with reference to FIGS. 4 and 5) the plate 41 with the mandrel assembly 20 and the pressure assembly 30 along the horizontal longitudinal guides 42. Upon reaching the advanced working position shown in phantom in FIG. 4, the movement of the plate 41 is automatically stopped by a pulse generated by a proximity sensor 48. The plate 41 is locked by raising the latch 39 until this engages the seat 40 of the plate 41 so as to lock the axial position of the mandrel assembly 20 and the intermediate assembly 30.

The motor 72 is activated to rotate the pressure roller 71 and the hydraulic actuator (not shown) urges the pressure roller 71 transversally against the die 51. The die 51 with the bottom plate 62 and the rotor 54 are driven for rotation about the axis X2.

In order to reduce the its wear, also the mandrel is preferably rotated in the same direction of rotation of the die 51 by means of a further hydraulic motor 37 so as to prevent the working surface 21a of the mandrel from sliding on the annular piece 10 during the first steps of the processing. In the example shown (FIG. 5) the hydraulic motor 37 acts on the intermediate roller 31 which transmits rotary motion to the mandrel 21 by means of the contacting flanges 31b and 21b.

The thrust exerted by the pressure roller 71 causes the workpiece 10 to be radially compressed between the inner working surface 53a or the die and the side working surface 21a of the mandrel. The axis of rotation X1 of the mandrel is kept in a stable position due to the contrast offered by the reaction assembly 90 and the intermediate assembly 30. The annular piece 10 is so progressively deformed. During processing, the mandrel 21 and the intermediate roller 31 are rotated by the thrust given by the rotating pressure roller 71.

Figure 6:
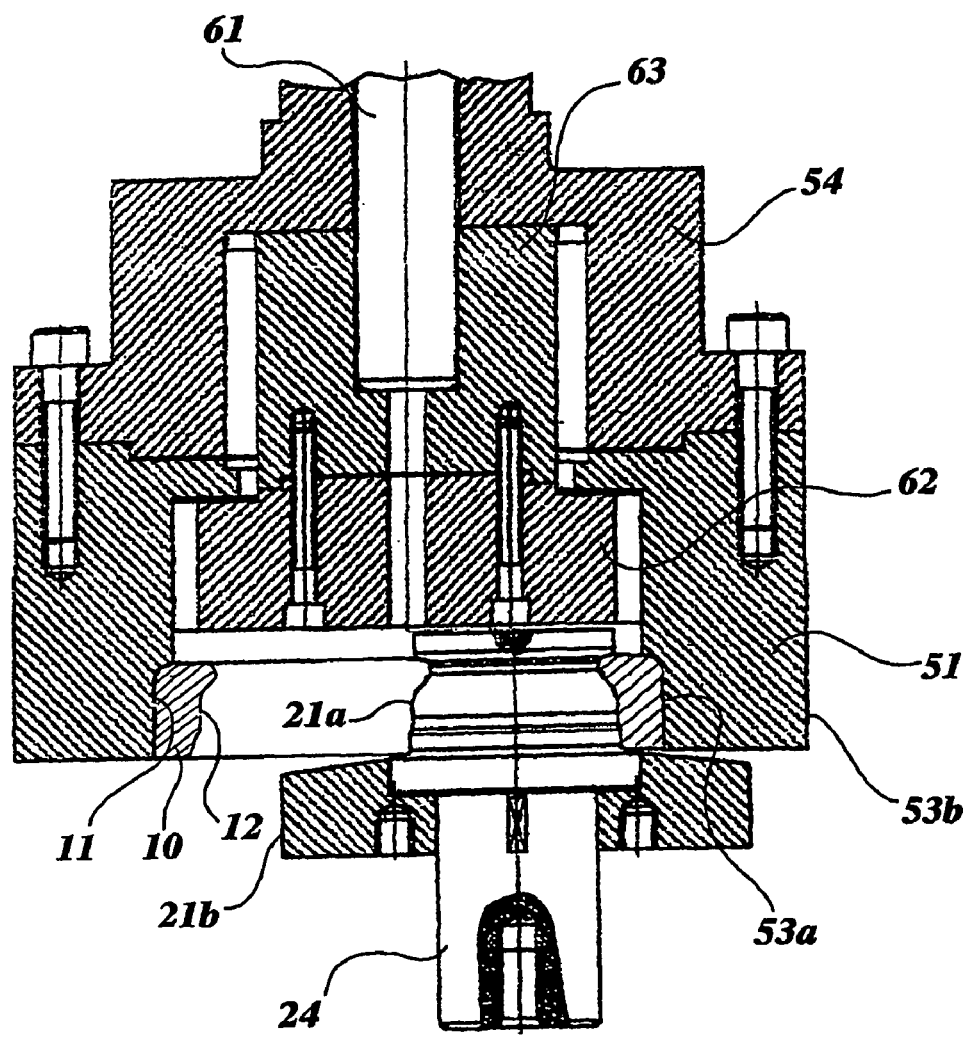
FIG. 6 is an axial sectional view of the forming members of the apparatus of FIG. 4 during a step of the rolling operation.

The outer or peripheral surface 11 of the piece 10 copies exactly the shape of the working surface 53a of the mandrel 51, and the inner surface 12 of the piece assumes a contour corresponding to that of the working surface 21a of the mandrel 21 (FIG. 6).

Once the piece 10 has been finished, the pressure assembly 70 and the die assembly 50 are slid along the transversal guides 80, 81 away from the reaction assembly 90. The latch 39 is withdrawn downwards disengaging the seat 40 of plate 41. The hydraulic motor 43 is activated to move the plate 41 with the mandrel assembly 20 and the intermediate assembly 30 longitudinally away from the die assembly 50. A pulse generated by a proximity sensor 49 stops the withdrawal of the plate 41 automatically.

Then the ejection assembly 60 is activated: through the rod 61, the block 63 and the bottom plate 62, the finished ring 10 is ejected out of the die 51 and caused to fall into a lower receptacle 59. Preferably the inner surface 53a of the die is somewhat conical, diverging in the direction of the mandrel assembly 20 so as to facilitate the ejection of the piece from the die.

The invention allows to attain the advantages that are typically reached by rolling processes but, as will be appreciated, it is also applicable for forming annular pieces having asymmetrical sections. In fact, by virtue of the closed loop structure of the die 51 and the stability conferred to the mandrel by the reaction assembly 90 and the intermediate assembly 30, unbalanced forces due to the asymmetry of the contour to be formed are efficiently opposed. As a result, a finished product is attained having a high dimensional accuracy and a longer life for the forming members of the apparatus.

Figure 1:
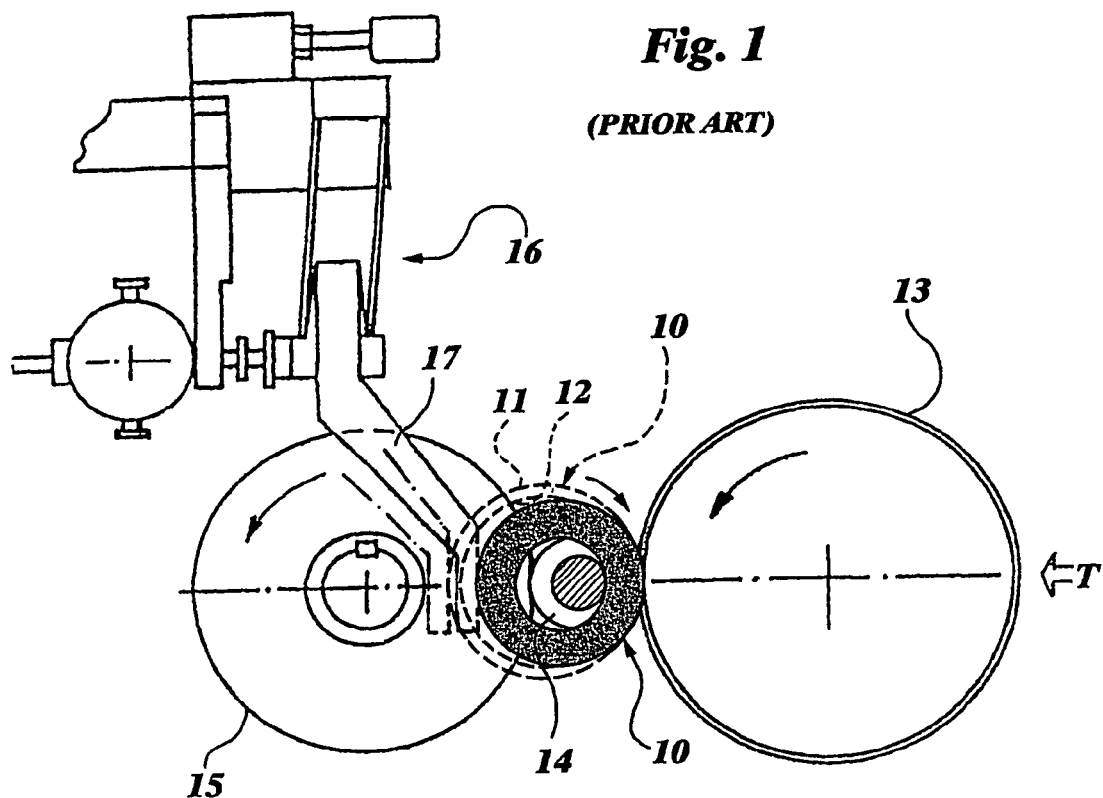
FIG. 1 is a schematical sectional view of part of a conventional rolling apparatus of the "open die" kind.
Figure 2:
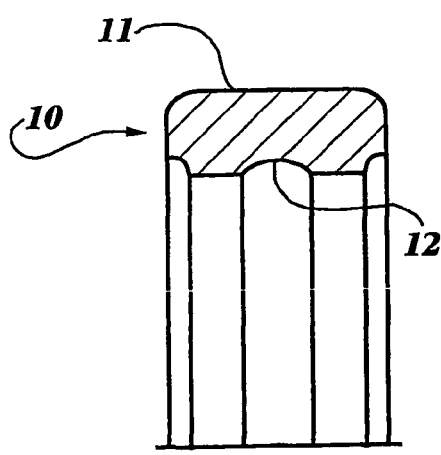
FIGS. 2 and 3 are schematical partial axial sectional views of two different bearing outer races, with a symmetrical and asymmetrical section, respectively.
Figure 3:
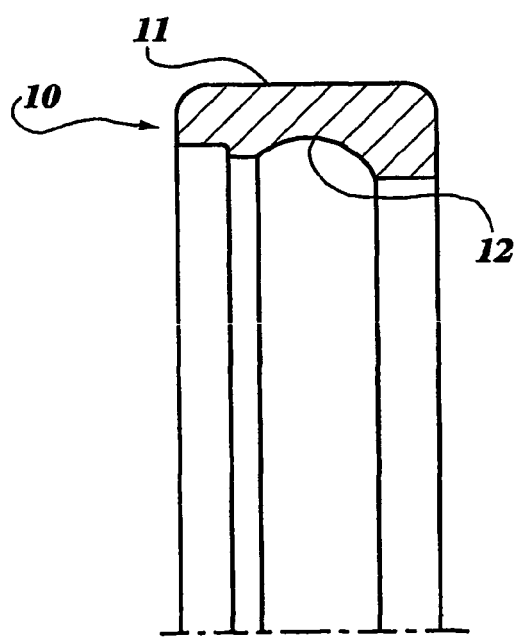

As compared to conventional turning working processes, the invention allows to reduce production costs of about 10–15%. Moreover, the control device indicated 16 in FIG. 1 for controlling the final dimension of the rolled piece is eliminated.

It is evident that the choice of mounting the die 51 rotatably about a transversally mobile axis and locating the forming mandrel 21 on a unit that is stationary during rolling operation may be preferable but is certainly not essential for the purposes of the implementation of the invention. In particular, the apparatus may be implemented in such manner as to cause the relative movement of the forming members differently from what has been described, without thereby departing from the scope of the present invention, as identified by the following claims.

What is claimed is:

1. A cold rolling apparatus for forming an annular piece (10) with an outer surface (11) having a given contour and an inner surface (12) having a given contour, starting from an annular blank, the apparatus comprising:
    a forming mandrel (21) rotatable about a first axis (X1), the mandrel having a working surface (21a) with a contour corresponding to that of the inner surface (12) to be formed,
    a forming die (51) rotatable about a second axis (X2) parallel to the first axis (X1), the die having a cavity (52) with an inner working surface (53a) in form of a surface of revolution corresponding to the outer surface (11) to be formed,
    first motor means (70, 72) for provoking rotation of the mandrel (21) and the die (51) about the respective axes (X1, X2),
    second motor means for varying in controlled manner the distance between the first (X1) and the second (X2) axes, so as to radially compress the workpiece (10) between the working surfaces (21a, 53a) of the mandrel (21) and the die (51);
    characterised in that the apparatus further comprises third motor means (43) for varying the relative axial distance between the mandrel (21) and the die (51), and
    wherein the mandrel (21) and an intermediate roller (31) are mounted on a plate (41) slidable along axial guide means (42) between a first, axially retracted loading position and a second, working position axially advanced towards the die (51), wherein in said second position the intermediate roller (31) is transversally interposed between and in contact with the mandrel (21) on one side, and a reaction assembly (90) provided with at least one idle roller (91, 92) on the other side.

2. The apparatus of claim 1, wherein the reaction assembly (90) comprises a pair of axial reaction rollers (91, 92) located respectively above (91) and underneath (92) the horizontal plane in which the axis (X3) of the intermediate roller (31) lies.

3. The apparatus of claim 2, wherein the axial reaction rollers (91, 92) are idly mounted on a centering support (93) hinged to a fixed supporting structure (38) about a longitudinal axis (X6) located at a height intermediate between those of the axial reaction rollers (91, 92).

4. The apparatus of claim 1, wherein the mandrel (21) and the intermediate roller (31) are mounted in respective journal boxes (23, 33) secured to the plate (41) so as to oscillate about respective longitudinal axes (X4, X5).

5. The apparatus of claim 1, comprising latch means (39) adapted for engaging corresponding seats (40) of the longitudinally slidable plate (41) so as to lock the plate (41) in said second advanced or working position.

6. The apparatus of claim 1, wherein the mandrel (21) is operatively associated with fourth motor means (37) for provoking a rotation of the mandrel in the same direction of rotation imparted to the mandrel during operation.

* * * * *